United States Patent
Sunil Kumar et al.

(10) Patent No.: US 11,294,042 B2
(45) Date of Patent: Apr. 5, 2022

(54) METHOD AND SYSTEM FOR DETECTING PRESENCE OF PARTIAL VISUAL FAULT IN LIDAR SENSOR OF VEHICLE

(71) Applicant: Wipro Limited, Bangalore (IN)

(72) Inventors: Balaji Sunil Kumar, Bengaluru (IN); Manas Sarkar, Barasat (IN)

(73) Assignee: Wipro Limited, Bangalore (IN)

( * ) Notice: Subject to any disclaimer, the term of this patent is extended or adjusted under 35 U.S.C. 154(b) by 321 days.

(21) Appl. No.: 16/283,863

(22) Filed: Feb. 25, 2019

(65) Prior Publication Data

US 2020/0209364 A1   Jul. 2, 2020

(30) Foreign Application Priority Data

Dec. 31, 2018 (IN) .............................. 201841050049

(51) Int. Cl.
*G01S 7/497* (2006.01)
*G01S 17/931* (2020.01)

(52) U.S. Cl.
CPC ............ *G01S 7/497* (2013.01); *G01S 17/931* (2020.01)

(58) Field of Classification Search
None
See application file for complete search history.

(56) References Cited

U.S. PATENT DOCUMENTS

| | | | |
|---|---|---|---|
| 9,043,069 B1 * | 5/2015 | Ferguson | G05D 1/00 701/23 |
| 9,292,913 B2 * | 3/2016 | Schultz | G06T 7/521 |
| 2017/0124781 A1 | 5/2017 | Douillard et al. | |
| 2017/0148326 A1 * | 5/2017 | Kang | G01S 17/87 |
| 2017/0193312 A1 * | 7/2017 | Ai | G06F 13/20 |
| 2019/0004535 A1 * | 1/2019 | Huang | G05D 1/0251 |
| 2019/0086514 A1 * | 3/2019 | Dussan | G01S 7/4817 |
| 2019/0332118 A1 * | 10/2019 | Wang | G06K 9/00805 |
| 2020/0110158 A1 * | 4/2020 | Ecins | G01S 7/497 |
| 2020/0182969 A1 * | 6/2020 | He | G01S 7/4808 |

* cited by examiner

*Primary Examiner* — Arleen M Vazquez
*Assistant Examiner* — Brandon J Becker
(74) *Attorney, Agent, or Firm* — Finnegan, Henderson, Farabow, Garrett & Dunner, LLP

(57) ABSTRACT

Embodiments of present disclosure relates to method and system to accurate detection of partial visual fault in lidar sensor of moving vehicle. Initially, first line cluster data for static objects present within first predefined view of Lidar sensor is determined. Static objects are tracked until viewing angle of Lidar sensor for corresponding static object is 90°. The tracking is performed based on second line cluster data corresponding to first line cluster data for static objects present within second predefined view of Lidar sensor. During tracking, non-observation of second line cluster data corresponding to first line cluster data, for one or more static objects is detected. Angle of non-observation is determined for one or more static objects upon detection. Presence of partial visual fault for Lidar sensor is detected based on angle of non-observation, for notifying navigation system associated with moving vehicle.

6 Claims, 9 Drawing Sheets

METHOD AND SYSTEM FOR DETECTING PRESENCE OF PARTIAL VISUAL FAULT IN LIDAR SENSOR OF VEHICLE

TECHNICAL FIELD

The present subject matter is related in general to field of automobiles, more particularly, but not exclusively to a method and system for detecting presence of partial visual fault in a Lidar sensor of a vehicle.

BACKGROUND

Light Direction and Ranging (Lidar) system is implemented to measure distance to a target object. The Lidar system is configured to illuminate the target object with pulsed laser light and measure reflected pulses with a Lidar sensor associated with the Lidar system. Lidar system have vast applications and especially in vehicles. A vehicle may use the Lidar system as main sensing device to track objects in an environment of the vehicle. Lidar points data associated with coordinates of the objects are collected from the Lidar system and are used for localizing the vehicle with respect to a global map. Said collection and localization is a continuous process, when the vehicle is moving. However, while the vehicle is in motion, the vehicle may face many uncertainties with respect to vision of the Lidar sensor. The uncertainties may be due to environment conditions, error is the Lidar system, presence of occlusion and so on. For example, a snowfall in the environment may cause partial blockage in the vision of the Lidar sensor and hence, there may be an error in the Lidar data points received from the Lidar system. Similarly, consider waterdrops accumulated on Lidar screen of the Lidar system. Also, consider a falling tree leaf just wrapping the lidar sensor for about 10 seconds. Such conditions lead to fault in collecting the Lidar data points. Since the movement of the vehicle is based on the Lidar data points, error in such Lidar data points may lead to undesired movement of the vehicle.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method of detecting presence of partial visual fault associated with a Light Detection and Ranging (Lidar) sensor of a moving vehicle. Initially, a first line cluster data corresponding to one or more static objects is determined. The first line cluster data comprises coordinate points associated with one or more static objects present within a first predefined view of a Lidar sensor in a moving vehicle. Further, each of the line clusters are tracked until a viewing angle of the Lidar sensor for a corresponding static object is 90 degrees. This is performed based on a second line cluster data, in a second predefined view of the Lidar sensor at a second time instant, corresponding to the first line cluster data from same one or more static objects. The distance of view of the Lidar sensor from the moving vehicle for the first predefined view is greater than the distance of view for the second predefined view. During tracking, a non-observation of the second line cluster data corresponding to the first line cluster data is identified. Upon identification, an angle of non-observation with respect to Lidar's orientation is determined. The angle of non-observation is a viewing angle of the Lidar sensor at which identifying the second line cluster corresponding to first line cluster happened at an instant of time just before the time of the non-observation. Presence of a partial visual fault determined based on the angle of non-observation, for notifying a navigation system associated with the moving vehicle.

In an embodiment, the present disclosure relates to a detection system for detection of partial visual fault associated with a Light Detection and Ranging (Lidar) sensor of a moving vehicle. The detection system comprises a processor and a memory communicatively coupled to the processor. The memory stores processor-executable instructions, which on execution cause the processor to detect the partial visual fault associated with the Lidar sensor. Initially, a first line cluster data corresponding to one or more static objects is determined. The first line cluster data comprises coordinate points associated with one or more static objects present within a first predefined view of a Lidar sensor in a moving vehicle. Further, each of the line clusters are tracked until a viewing angle of the Lidar sensor for a corresponding static object is 90 degrees. This is performed based on a second line cluster data, in a second predefined view of the Lidar sensor at a second time instant, corresponding to the first line cluster data from same one or more static objects. The distance of view of the Lidar sensor from the moving vehicle for the first predefined view is greater than the distance of view for the second predefined view. During tracking, a non-observation of the second line cluster data corresponding to the first line cluster data is identified. Upon identification, an angle of non-observation with respect to Lidar's orientation is determined. The angle of non-observation is a viewing angle of the Lidar sensor at which identifying the second line cluster corresponding to first line cluster happened at an instant of time just before the time of the non-observation. Presence of a partial visual fault determined based on the angle of non-observation, for notifying a navigation system associated with the moving vehicle.

In an embodiment, the present disclosure relates to a non-transitory computer readable medium including instructions stored thereon that when processed by at least one processor cause a device to detect partial visual fault associated with a Light Detection and Ranging (Lidar) sensor of a moving vehicle. Initially, a first line cluster data corresponding to one or more static objects is determined. The first line cluster data comprises coordinate points associated with one or more static objects present within a first predefined view of a Lidar sensor in a moving vehicle. Further, each of the line clusters are tracked until a viewing angle of the Lidar sensor for a corresponding static object is 90 degrees. This is performed based on a second line cluster data, in a second predefined view of the Lidar sensor at a second time instant, corresponding to the first line cluster data from same one or more static objects. The distance of view of the Lidar sensor from the moving vehicle for the first predefined view is greater than the distance of view for the second predefined view. During tracking, a non-observation of the second line cluster data corresponding to the first line cluster data is identified. Upon identification, an angle of non-observation with respect to Lidar's orientation is determined. The angle of non-observation is a viewing angle of the Lidar sensor at which identifying the second line cluster corresponding to first line cluster happened at an instant of time just before the time of the non-observation. Presence of a partial visual fault determined based on the angle of non-observation, for notifying a navigation system associated with the moving vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which:

Figure 1:
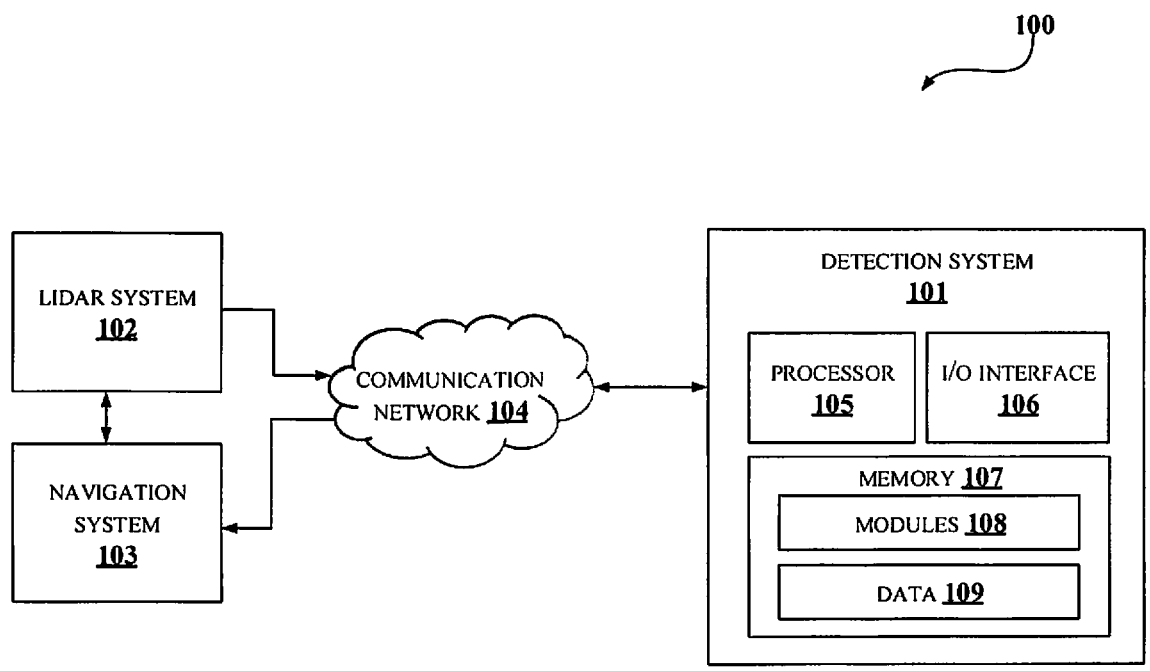
FIG. 1 shows an exemplary environment of a detection system for detection of partial visual fault associated with a Lidar sensor of a moving vehicle, in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

A navigation system in a vehicle is configured to navigate the vehicle based on inputs provided by a user associated with the vehicle. Consider the vehicle is an autonomous vehicle which is configured to navigate without human intervention. Navigation system in such vehicle is coupled with user interface through which the user may input destination point of the vehicle. Based on the destination point, the navigate system may take decision on generating a route and navigating the vehicle. The Lidar system in the moving vehicle is configured to collect coordinate points of objects present in an environment of the vehicle. Data from the Lidar system is used by the navigation system to localize the vehicle with respect to global map, at very instant of time, during the navigation. Present disclosure proposes a method and system for detecting partial visual fault in a Lidar sensor of a moving vehicle.

In the present disclosure, line cluster data associated with one or more static objects at an instant of time for a long distance view of the Lidar sensor of the vehicle is determined. For example, consider the vehicle is moving forward, the line cluster data associated with static objects in front of the vehicle may be determined. While the vehicle is moving forward, as distance of the vehicle and the static objects is reduced, the system keeps track of the line cluster data of the static objects at shorter distance as well. If the system loses track of the line cluster data, at the shorter distance, the system is configured to identify the angle of partial visual fault in the Lidar sensor and notify a navigation system of the vehicle. By this, safety of the vehicle is ensured in case of error functioning of the Lidar sensor which may be due of environmental conditions or internal faults in the Lidar sensor.

FIG. 1 shows an exemplary environment 100 of a detection system 101 for detection of partial visual fault associated with a Lidar sensor of a moving vehicle, in accordance with some embodiments of the present disclosure. The exemplary environment 100 may comprises the detection system 101, a Lidar system 102, a navigation system 103 and a communication network 104. The detection system 101 may be configured to perform the steps of the present disclosure. The Lidar system 102 may comprises a Lidar sensor, an optical system, receiver modules, transmitter modules, processing modules and so on, for collecting coordinate points data of static objects in an environment of the moving vehicle. The collected coordinate points data may be used for localising the moving vehicle with respect to global coordinates. Based on the localisation, the navigation system 103 may navigate the moving vehicle. In an embodiment, the Lidar system 102 may be alternatively be referred to the Lidar sensor. In an embodiment, the detection system 101 may communicate with at least one of the Lidar system 102 and the navigation system 103 via the communication network 104. In an embodiment, the exemplary environment 100 may be an environment inside a vehicle. The detection system 101, the Lidar system 102, the navigation system 103 and the communication network 104 may be implemented inside the vehicle. In an embodiment, the detection system 101 may be externally connected with a vehicle comprising the Lidar system 102 and the navigation system 103. In an embodiment, the detection system 101 may communicate with each of the Lidar system 102 and the navigation system 103, using dedicated communication networks (not shown in the figure). In an embodiment, the communication network 104 may include, without limitation, a direct interconnection, Local Area Network (LAN), Wide Area Network (WAN), Controller Area Network (CAN), wireless network (e.g., using Wireless Application Protocol), the Internet, and the like. In an embodiment, the detection system 101 may be an integral part of at least one of the Lidar system 102 and the navigation system 103 (not shown in the figure).

Further, the detection system 101 may include a processor 105, I/O interface 106, and a memory 107. In some embodiments, the memory 107 may be communicatively coupled to the processor 105. The memory 107 stores instructions, executable by the processor 105, which, on execution, may cause the detection system 101 to detect the partial visual fault in the Lidar sensor, as disclosed in the present disclosure. In an embodiment, the memory 107 may include one or more modules 108 and data 109. The one or more modules 108 may be configured to perform the steps of the present disclosure using the data 109, to detect the partial visual fault. In an embodiment, each of the one or more modules 108 may be a hardware unit which may be outside the memory 107 and coupled with the detection system 101. The detection system 101 may be implemented in a variety of computing systems, such as a laptop computer, a desktop computer, a Personal Computer (PC), a notebook, a smartphone, a tablet, e-book readers, a server, a network server, a cloud-based server and the like.

In the present disclosure, the detection system 101 may perform the detection of the partial visual fault 101, when a vehicle is moving. For the moving vehicle, initially, the detection system 101 is configured to determine a first line cluster data from the Lidar sensor data points at an instant of time. Consider the view of the Lidar sensor at the instant of time is a first predefined view. The first line cluster data includes coordinate points associated with one or more static objects present within the first predefined view of the Lidar sensor. The one or more static objects may be man-made objects on road side found in route of the moving vehicle. The first predefined view may be a longer distance view of the Lidar sensor. In an embodiment, the first line cluster data may be determined from data points received by the Lidar system 102 associated with the moving vehicle. In an embodiment, the detection system 101 may be configured to receive the coordinate points at the first predefined view and determine the first line cluster. The first line cluster may be formed by connecting the coordinate points to form a line. In an embodiment, the detection system 101 may be configured to determine the first line cluster for one or more static objects using coordinate points of corresponding object. One or more techniques, known to a person skilled in the art, may be implemented for determining the first line cluster. In an embodiment, the first line cluster of each of the one or more static objects represents corresponding static objects.

Upon receiving the first line cluster data, corresponding to one or more static objects the detection system 101 may check if the moving vehicle has passed by the one or more static objects. The moving vehicle is said to have passed the one or more static objects, if a viewing angle of the centroid of the first line cluster corresponding to the one or more static objects is 90 degrees. In the present disclosure, as the moving vehicle moves nearer to the one or more static objects represented by first line cluster, the detection system 101 is configured to track those one or more static objects by tracking the line cluster. The tracking may be performed until the viewing angle of the Lidar sensor for the corresponding one or more static object is about 90 degrees.

For the tracking, as the moving vehicle moves nearer to the one or more static objects, the detection system 101 determine the second line cluster data from the Lidar sensor data points corresponding to the first line cluster data. The second line cluster data includes coordinate points associated with one or more static objects present within a second predefined view, those were present in the first predefined view of the Lidar sensor. The second predefined view may be a shorter distance view of the Lidar sensor. The distance of view of any of the of the one or more static objects by the Lidar sensor from the moving vehicle for the first predefined view is greater than the distance of view of corresponding static object from the second predefined view. In an embodiment, the second line cluster data may be determined from the data points received by Lidar system 102 associated with the moving vehicle. In an embodiment, the detection system 101 may be configured to determine a second line cluster using coordinate points received for the second predefined view. In an embodiment, the second line cluster may be formed by connecting the coordinate points to form a line. One or more techniques, known to a person skilled in the art, may be implemented for determining the second line cluster.

In an embodiment, the second line cluster data, corresponding to the first line cluster data, is searched, for each of the one or more static objects in the second predefined view of the vehicle. This may be termed as the tracking in the present disclosure. The first line cluster data is compared with the corresponding second line cluster data for the tracking. In an embodiment, a first centroid data and a first orientation data associated with the first line cluster data may be computed. Also, a second centroid data and a second orientation data associated with the second line cluster data may be computed corresponding to the first centroid data and the first orientation data. In an embodiment, the identification and determination of the second line cluster with same centroid data and same orientation data, corresponding to first centroid data may be termed as tracking. For determination of the second line cluster, the centroid data and the orientation data of the first line cluster act as a hint. Searching for the second line cluster is performed in and around the centroid data of the first line cluster and with the orientation data of the first line cluster.

In an embodiment, the first orientation data and the first centroid data may be compared with the second orientation data and the second centroid data, respectively, together for the tracking. Said tracking by determinizing the second line cluster data may be performed for every shorter distance of the Lidar sensor, until the moving vehicle passes the one or more static objects.

During tracking, due to one or more factors, one or more static objects, from the one or more static objects, may be not visible to the Lidar sensor from any particular viewing angle. The one or more factors may include, but not limited to, environmental conditions, faults in the Lidar sensor, presence of occlusion and so on. In such cases, the Lidar sensor may not be able to track the second line cluster data corresponding to the first line cluster data, for said one or more static objects. The detection system 101 is configured to detect a non-observation of the second line cluster data corresponding to the first line cluster data, for the one or more static objects. Upon detection of the non-observation, an angle of non-observation may be determined for each of the one or more static objects. In an embodiment, the angle of non-observation is a viewing angle of the Lidar sensor for a corresponding static object at an instant of time before the detection of the non-observation. One or more techniques, known to a person skilled in the art, may be implemented for determining the angle of non-observation.

By determining the angle of non-observation, the presence of the partial visual fault for the Lidar sensor may be detected by the detection system 101. Further, upon the detection of presence of the partial visual fault, the detection system 101 may be configured to notify the navigation system 103 associated with the moving vehicle. In an embodiment, by the notification, the navigation system 103 may be alerted that there is an issue associated with the Lidar system 102 of the moving vehicle. By which, decision with respect to navigation of the moving vehicle may be taken. In an embodiment, upon the notification, the moving vehicle may be stopped for purpose of safety.

Figure 2:
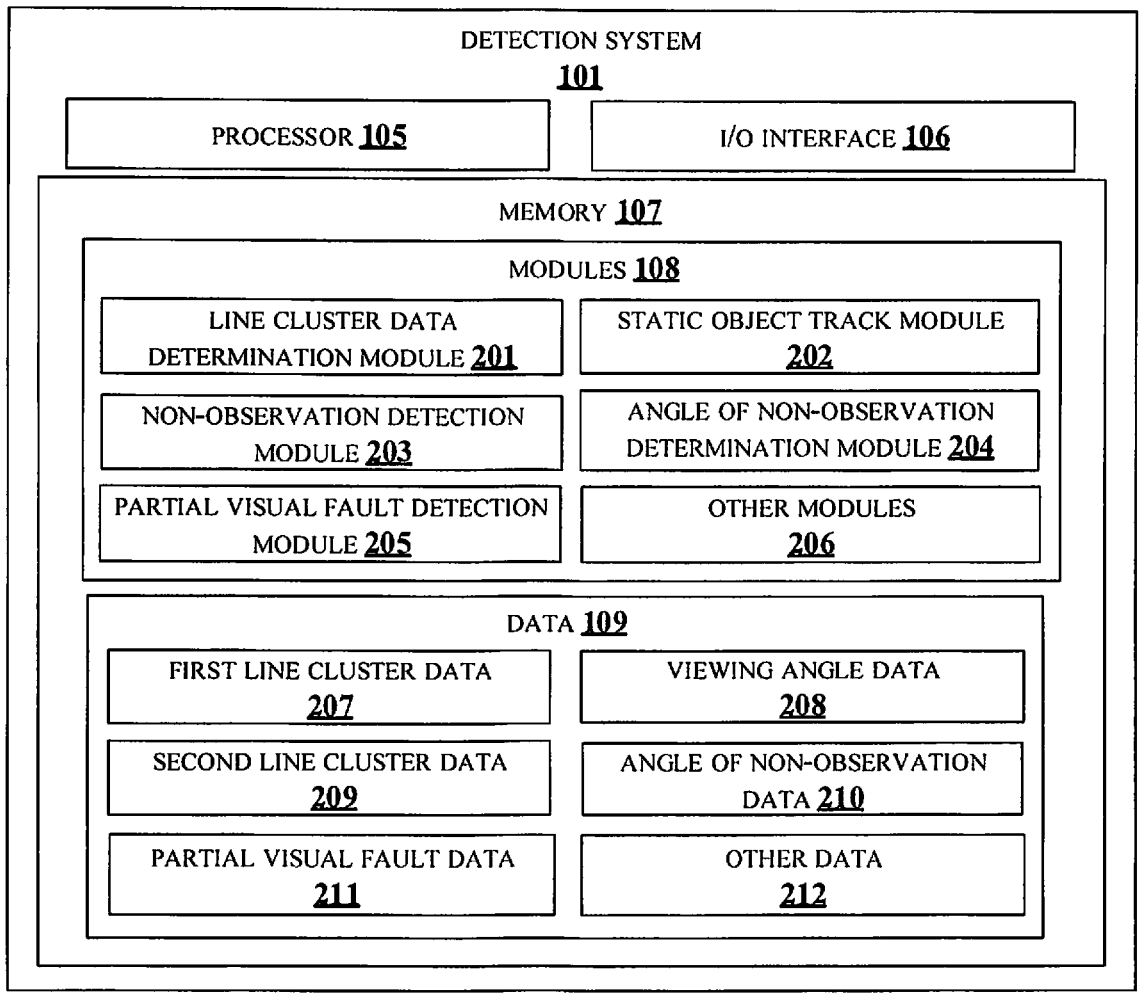
FIG. 2 shows a detailed block diagram of a detection system for detection of partial visual fault associated with a Lidar sensor of a moving vehicle, in accordance with some embodiments of the present disclosure.

FIG. 2 shows a detailed block diagram of the detection system 101 for detection of the partial visual fault associated with the Lidar sensor of the moving vehicle, in accordance with some embodiments of the present disclosure;

The data 109 and the one or more modules 108 in the memory 107 of the detection system 101 may be described herein in detail.

In one implementation, the one or more modules 108 may include, but are not limited to, a line cluster data determination module 201, a static object track module 202, a non-observation detection module 203, an angle of non-observation determination module 204 and a partial visual fault detection module 205 and one or more other modules 206, associated with the detection system 101.

In an embodiment, the data 109 in the memory 107 may comprise first line cluster data 207, viewing angle data 208 (also referred to as viewing angle 208), second line cluster data 209, angle of non-observation data 210 (also referred to as angle of non-observation 210), partial visual fault data 211 and other data 212 associated with the detection system 101.

In an embodiment, the data 109 in the memory 107 may be processed by the one or more modules 108 of the detection system 101. In an embodiment, the one or more modules 108 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

One or more modules of the present disclosure function to detect the partial visual fault associated with the Lidar sensor of the moving vehicle.

Figure 3A:
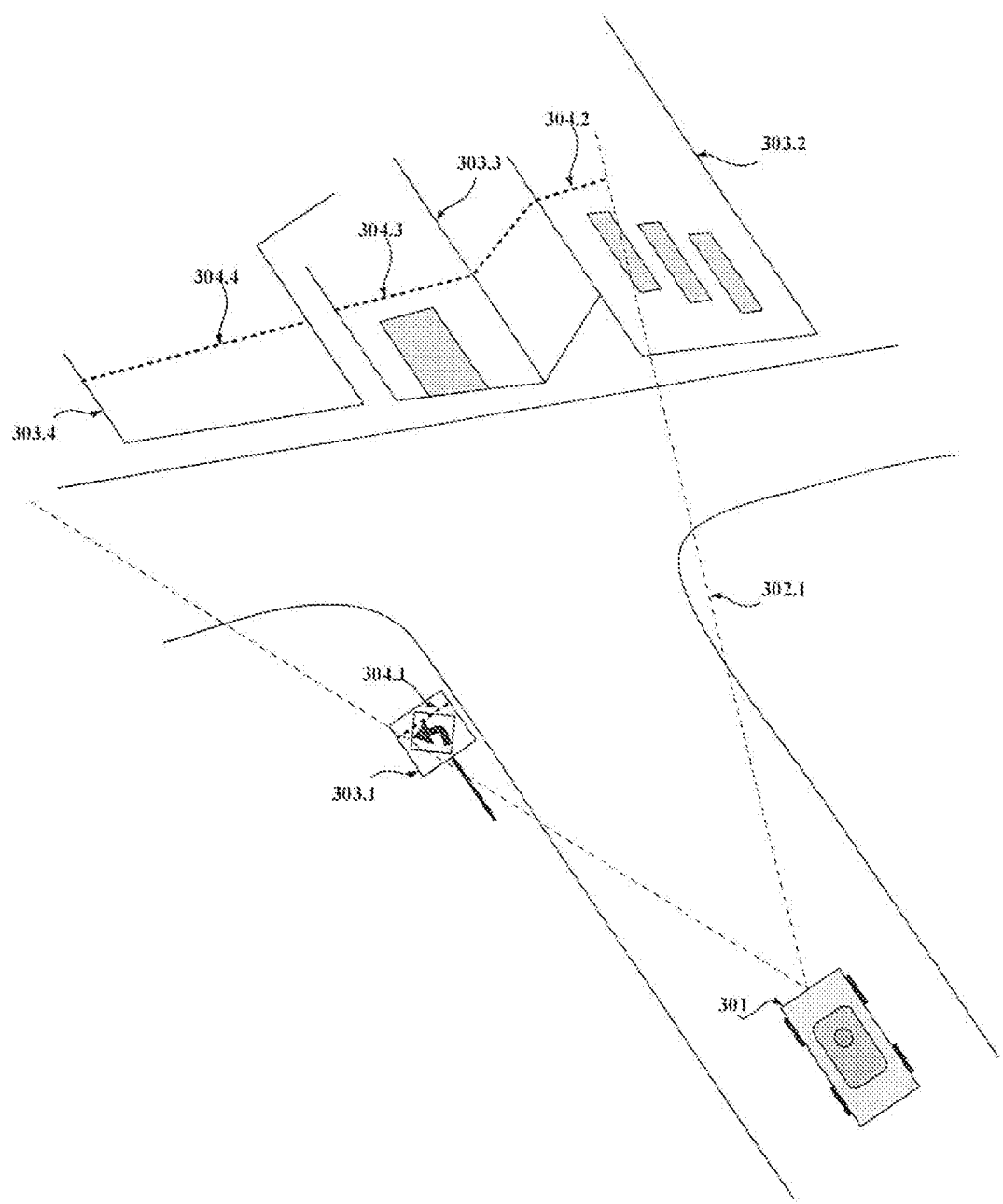
FIGS. 3a-3d illustrate exemplary embodiments for detection of partial visual fault associated with a Lidar sensor of a moving vehicle, in accordance with some embodiments of present disclosure.

The line cluster data determination module 201 of the detection system 101 is configured to determine the first line cluster data 207 of the Lidar sensor. FIG. 3a shows an exemplary embodiment illustrating first predefined view of a moving vehicle. Consider an environment illustrated in FIG. 3a. The environment comprises a moving vehicle 301 and one or more static objects 303.1 . . . 303.4. In an embodiment, the line cluster data determination module 201 may be configured to receive reflection points (also referred to as coordinate points) of the Lidar sensor at a first predefined view 302.1. The first predefined view 302.1 may be a long distance view of the Lidar sensor. The first predefined view 302.1 may be associated with a predefined horizontal boundary and a predefined vertical boundary to cover the one or more static objects at longer distance from the moving vehicle 301. In an embodiment, distance of view of the one or more static objects 303.1 . . . 303.4 for the first predefined view 302.1 may be set in accordance with embodiments of the present disclosure. In an embodiment, the line cluster data determination module 201 may be configured to determine the first line clusters 304.1 . . . 304.4 for each of the one or more static objects 303.1 . . . 303.4, using the reflected points received for the first predefined view 302.1. In an embodiment, a region growing algorithm is implemented around the reflected points to determine the first line clusters 304.1 . . . 304.4. In an embodiment, the first line clusters 304.1 . . . 304.4 for the moving vehicle 301 may be stored as the first line cluster data 207. In an embodiment, the first line clusters 304.1 . . . 304.4 may be determined to identify offset position of the moving vehicle 301 with respect to the one or more static objects 303.1 . . . 303.4.

Upon receiving the first line cluster data 207, the static object track module 202 is configured to track each of the one or more static objects 303.1 . . . 303.4 until the viewing angle of the Lidar sensor for each of the one or more static objects 303.1 . . . 303.4 is 90 degrees. With such a condition, each of the one or more static objects 303.1 . . . 303.4 may be tracked until the moving vehicle 301 passes the corresponding static object.

For the tracking, as the moving vehicle 301 moves nearer to the one or more static objects 303.1 . . . 303.4, the static object track module 202 is configured to check for the second line cluster data 209 of the Lidar sensor corresponding to the first line cluster data 207. In an embodiment, second centroid data corresponding to the second line cluster data may be computed. Angle between the direction of second centroid data from Lidar sensor and the orientation of Lidar sensor may be checked. When the angle between the second centroid data and the Lidar sensor is 90 degrees, static object corresponding to such second centroid data may be identified to be passed by the moving vehicle.

Figure 3B:
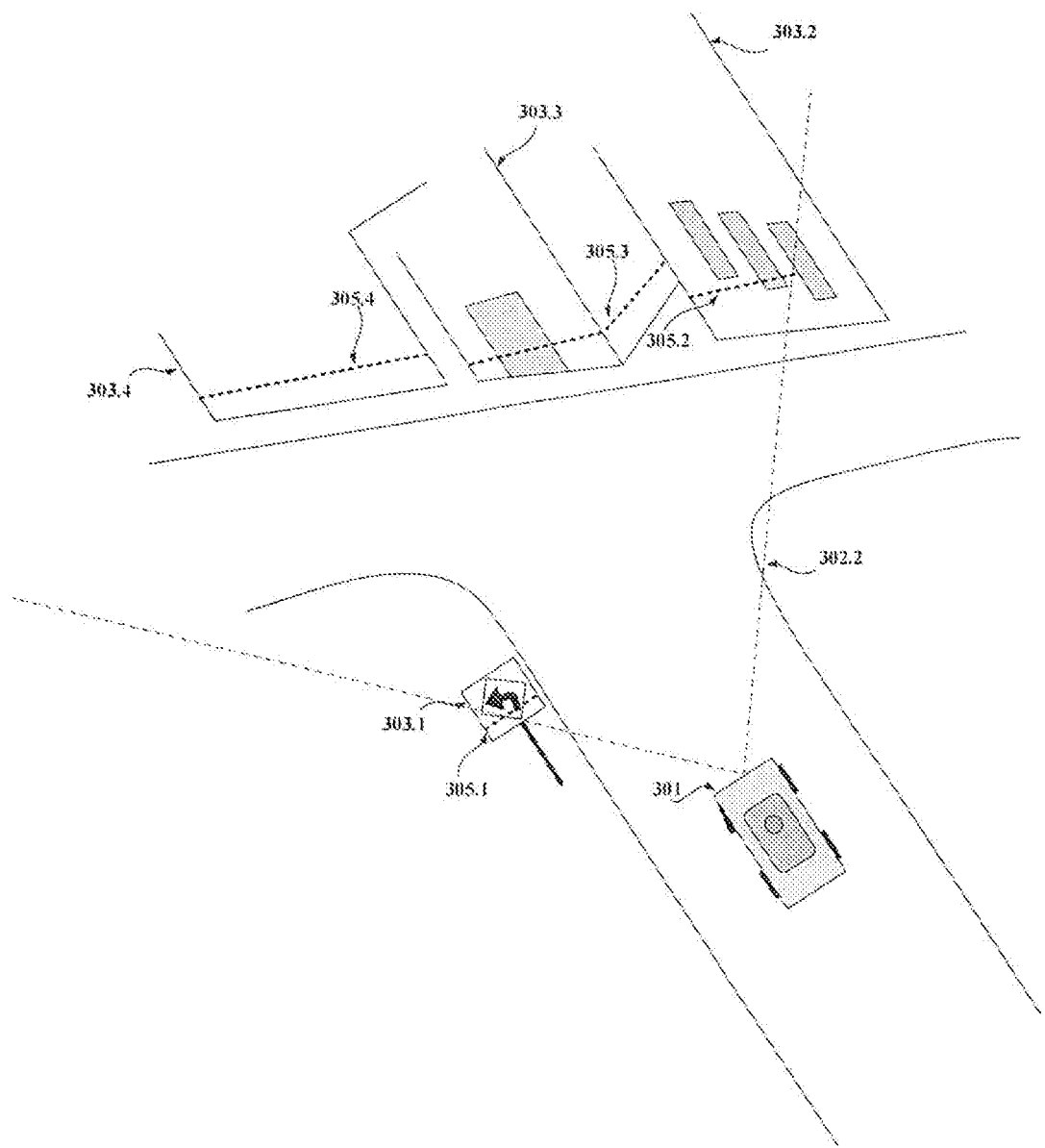

FIG. 3b shows an exemplary embodiment illustrating second predefined view of the moving vehicle 301. In an embodiment, the line cluster data determination module 201 may be configured to receive reflection points of the Lidar sensor at a second predefined view 302.2, for the tracking performed by the static object track module 202. The second predefined view 302.2 may be a short distance view of the Lidar sensor. The second predefined view 302.2 may be associated with a predefined horizontal boundary and a predefined vertical boundary to cover the one or more static objects 303.1 . . . 303.4 at shorter distance from the moving vehicle 301. In an embodiment, the second predefined view 302.2 may be associated with wider horizontal boundary when compared to the first predefined view 302.1. In an embodiment, distance of view for the second predefined view 302.2 may be set in accordance with embodiments of the present disclosure. In an embodiment, the line cluster data determination module 201 may be configured to determine second line clusters 305.1 . . . 305.4 corresponding to the first line clusters 304.1 . . . 304.4, for static objects 303.1 . . . 303.4 in the second predefined view 302.2, using the reflected points received for the second predefined view 302.2. In an embodiment, a region growing algorithm is implemented around the reflected points to determine the second line clusters 305.1 . . . 305.4. In an embodiment, the second line clusters 305.1 . . . 305.4 for the moving vehicle 301 may be stored as the second line cluster data 209. In an embodiment, the second line clusters 305.1 . . . 305.4 are determined to identify offset position of the moving vehicle 301 with respect to the one or more static objects 303.1 . . . 303.4.

Figure 3C:
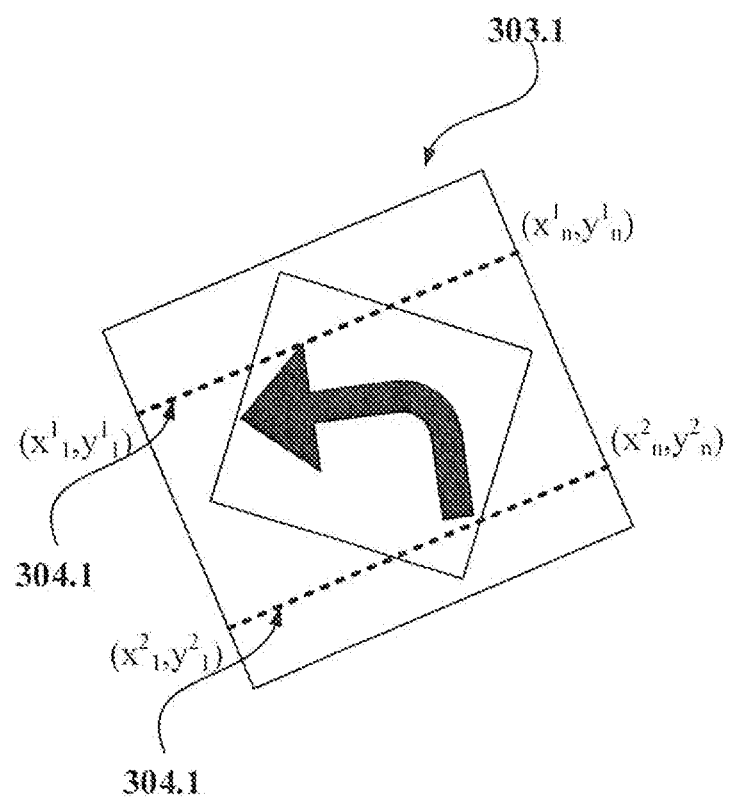

The static object track module 202 may determine the second line cluster data 209 from the line cluster data determination module 201 and compare the first line cluster data 207 with the second line cluster data 209, for the tracking. FIG. 3c shows an exemplary embodiment illustrating comparing of the first line cluster data 207 and the second line cluster data 209 for a static object 303.1. Consider coordinates associated with the first line cluster data 207 for the static object 303.1 may be $(x^1_1, y^1_1) \ldots (x^1_n, y^1_n)$. Similarly, coordinates associated with the second line cluster data 209 for the static object 303.1 may be $(x^2_1, y^2_1) \ldots (x^2_n, y^2_n)$. For comparing, the first line cluster data 207 and the second line cluster data 209, a first centroid data and a first orientation data associated with each of the first line cluster data 207 may be computed. Further, a second centroid data and a second orientation data associated with the second line cluster data 209 may be computed when the second line cluster data 209 corresponding to the first line cluster data 206 is determined.

Consider the first centroid data for the first line cluster data 207 may be $C^1_X$ and $C^1_Y$. In an embodiment, the first centroid data for the first line cluster data 207 may be computed using equations 1 and 2, respectively, given below:

$$C^1{}_X = \frac{(x^1_1 + x^1_2 + x^1_3 \ldots x^1_n)}{n} \quad (1)$$

$$C^1{}_Y = \frac{(y^1_1 + y^1_2 + y^1_3 \ldots y^1_n)}{n} \quad (2)$$

Further, consider the first orientation data for the first line cluster data 207 may be $O_1$. The first orientation data for the first line cluster data 207 may be computed using equation 3, given below:

$$O_1 = \tan^{-1}\left(\frac{(y^1_n - y^1_1)}{(x^1_n - x^1_1)}\right) \quad (3)$$

Consider the second centroid data for the second line cluster data 209 may be $C^2_X$ and $C^2_Y$. In an embodiment, the second centroid data for the second line cluster data 209 may be computed using equations 4 and 5 given below:

$$C^2{}_X = \frac{(x^2_1 + x^2_2 + x^2_3 \ldots x^2_n)}{n} \quad (4)$$

$$C^2{}_Y = \frac{(y^2_1 + y^2_2 + y^2_3 \ldots y^2_n)}{n} \quad (5)$$

Further, consider the second orientation data for the first line cluster data 207 may be $O_2$. The second orientation data for the second line cluster data 209 may be computed using equation 6, given below:

$$O_2 = \tan^{-1}\left(\frac{(y^2_n - y^2_1)}{x^2_n - x^2_1}\right) \quad (6)$$

In an embodiment, $C^1_X$ and $C^1_Y$ may be compared with $C^2_X$ and $C^2_Y$, for the tracking. In an embodiment, $O_1$ may be compared with $O_2$, for the tracking. By the comparison, in an embodiment, similar alignment of centroid and orientation between the first line cluster data 207 and the second line cluster data 209 is checked. If the alignment of centroid and the orientation between the first line cluster data 207 and the second line cluster data 209 is similar, the static object track module 202 may determine the one or more static objects 303.1 . . . 301.4 are tracked at the second predefined view 302.2. Thereby, continuity of observation of the one or more static objects may be detected.

During the tracking in the second predefined view 302, line cluster data for one or more new static objects may be determined by the line cluster data determination module 201. Said one line cluster data for one or more new static objects may be stored as the first line cluster data 207 and said second predefined view may be considered as first predefined view for the one or more new static objects. Further, tracking of the one or more new static objects may be performed. Said tracking may be performed based on line cluster data determined at shorted distance of view for the one or more new static objects i.e., second line cluster data 209 for the one or more new static objects. The tracking of the one or more static objects may be performed until the one or more new objects are passed by the moving vehicle.

During tracking, the second line cluster data 209 for the one or more static objects may not be determined. The non-observation detection module 203 may be configured to detect the non-observation of the second line cluster data 209 corresponding to the first line cluster data 207, for the one or more static objects. In an embodiment, the non-observation may be detected when a second line cluster data with similar centroid data as with the first centroid data and the orientation data aligned to the first orientation data is not determined. One or more methods, known to a person skilled in the art, may be implemented, to determine the second line cluster data 209.

Figure 3D:
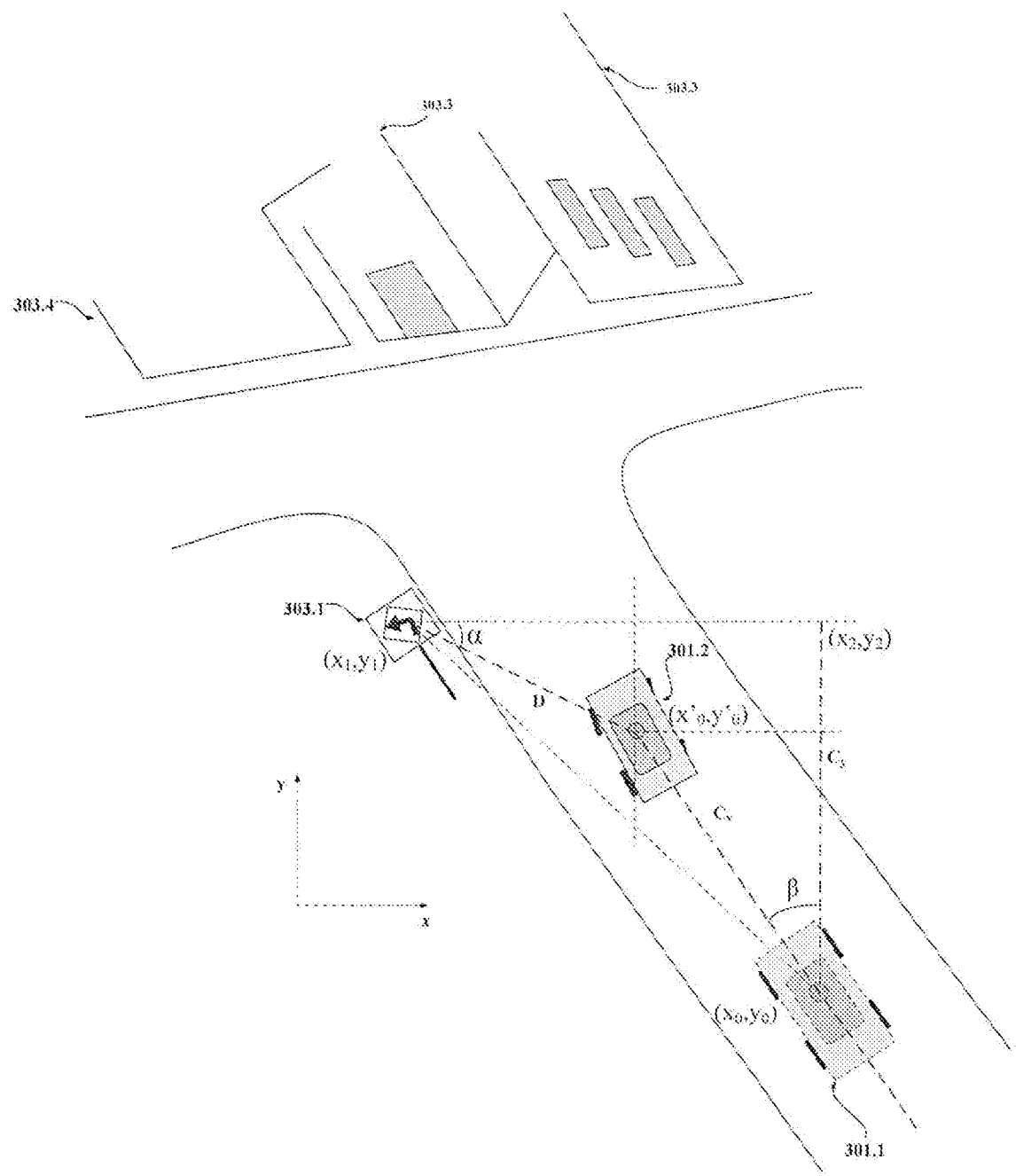

Upon, representing the one or more static objects in form of first line cluster, tracking by determining the second line cluster, the angle of non-observation determination module 204 may be configured to determine the angle of non-observation 210 if any for those one or more static objects till vehicle mount Lidar system crosses it. In an embodiment, the angle of non-observation 210 is a viewing angle 208 of the Lidar sensor for a corresponding static object at an instant of time before the detection of the non-observation. FIG. 3d shows an exemplary embodiment illustrating determining of the angle of non-observation 210. Consider, the one or more static objects for which the non-availability is detected to be the static object 303.1.

Consider coordinate points associated with the moving vehicle 301.2 during the second predefined view, at the instant of time before the detection of the non-observation, is $(x'_0, y'_0)$. The coordinate points associated with the moving vehicle 301.1 during the first predefined view 302.1 is $(x_0, y_0)$. The coordinate points associated with the static object 303.1 is $(x_1, y_1)$. The coordinate points associated with the static object 303.1 may be determined at the first predefined view 302.1, with respect to the global map. From FIG. 3d, distance between the moving vehicle 301.2 at the second predefined view 302.2, and the static object 303.1 may be computed using equation 7, given below:

$$D=\sqrt{(x_1-x'_0)^2+(y_1-y'_0)^2} \quad (7)$$

Consider the moving vehicle is moving straight when the non-observation is detected. The distance $C_v$, covered by the moving vehicle from $(x_0, y_0)$ to $(x'_0, y'_0)$, may be the computed using equation 8 given below:

$$C_v=\sqrt{(x'_0-x_0)^2+(y'_0-y_0)^2} \quad (8)$$

Hence, vertical direction shift $C_y$, i.e., shift of the moving vehicle along Y axis, may be computed using equation 9 given below:

$$C_y=C_v*\cos(\beta) \quad (9)$$

where $\beta$ is orientation of the moving vehicle 301 with respect to the Y axis.

Also, from the figure, equation 10, as given below, may be derived:

$$y_2-C_y=D*\sin(\alpha) \quad (10)$$

From equation 10, the value of $\alpha$ may be computed using equations 11 to 15.

$$\sin(\alpha) = \frac{(y_2 - C_y)}{D} \quad (11)$$

$$\sin(\alpha) = \frac{(y_2 - (C_v*\cos(\beta)))}{D} \quad (12)$$

From the figure, $y_2 = y_1$ (13)

Hence, $$\sin(\alpha) = \frac{(y_1 - (C_v*\cos(\beta)))}{D} \quad (14)$$

$$\alpha = \sin^{-1}\frac{(y_1 - (C_v*\cos(\beta)))}{D} \quad (15)$$

Further, the angle of non-observation $A_{no}$ may be computed using equation 16, given below:

$$A_{no}=(90°-\alpha)-\beta \quad (16)$$

By determining the angle of non-observation 210, the presence of the partial visual fault for the Lidar sensor may be detected by the partial visual fault detection module 205.

In an embodiment, the angle of non-observation 210 may be kept on record for similar identification of non-observation in the Lidar sensor. Based on repeated non-observation scenario at particular angle, the partial visual fault detection module 205 may be configured to notify the navigation system 103 of the moving vehicle 301. In an embodiment, the notification associated with the presence of the partial visual fault may be stored as the partial visual fault data 211. In an embodiment, the notification may indicate unnatural behavior or possible error in the Lidar system 102. Further, based on the notification, the navigation system 103 may be alerted to monitor the Lidar system 102 and check accuracy of the reflected points received from the Lidar system 102. Also, the navigation may be configured to decide whether to continue navigation or stop movement of the moving vehicle 301.

The other data 212 may store data, including temporary data and temporary files, generated by modules for performing the various functions of the detection system 101. The one or more modules 108 may also include other modules 206 to perform various miscellaneous functionalities of the detection system 101. It will be appreciated that such modules may be represented as a single module or a combination of different modules.

Figure 4A:
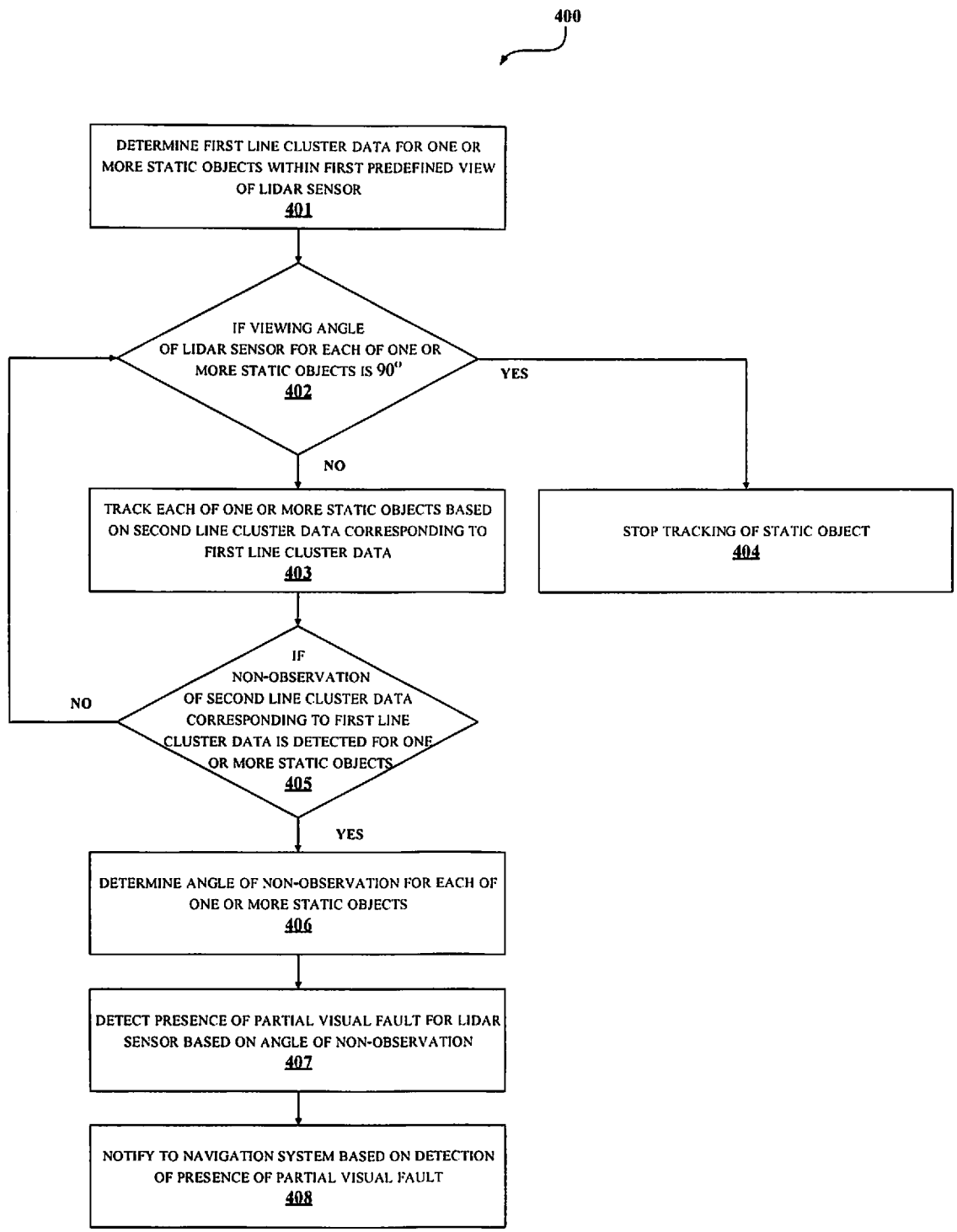
FIG. 4a illustrates a flowchart showing an exemplary method for detecting partial visual fault associated with a Lidar sensor of a moving vehicle, in accordance with some embodiments of present disclosure.

FIG. 4a illustrates a flowchart showing an exemplary method for detecting the partial visual fault associated with the Lidar sensor of the moving vehicle, in accordance with some embodiments of present disclosure;

At block 401, the line cluster data determination module 201 may be configured to determine the first line cluster data 207 of the Lidar sensor. The first line cluster data 207 includes the coordinate points associated with each of the one or more static objects present within the first predefined view of the Lidar sensor.

At block 401, the static object track module 202 may be configured to check if the viewing angle 208 of the Lidar sensor for each of the one or more static objects is 90 degrees. When the viewing angle 208 of the Lidar sensor for each of the one or more static objects is not 90 degrees, step at block 403 is performed. When the viewing angle 208 of the Lidar sensor for each of the one or more static objects is 90 degrees, step at block 404 is performed.

Figure 4B:
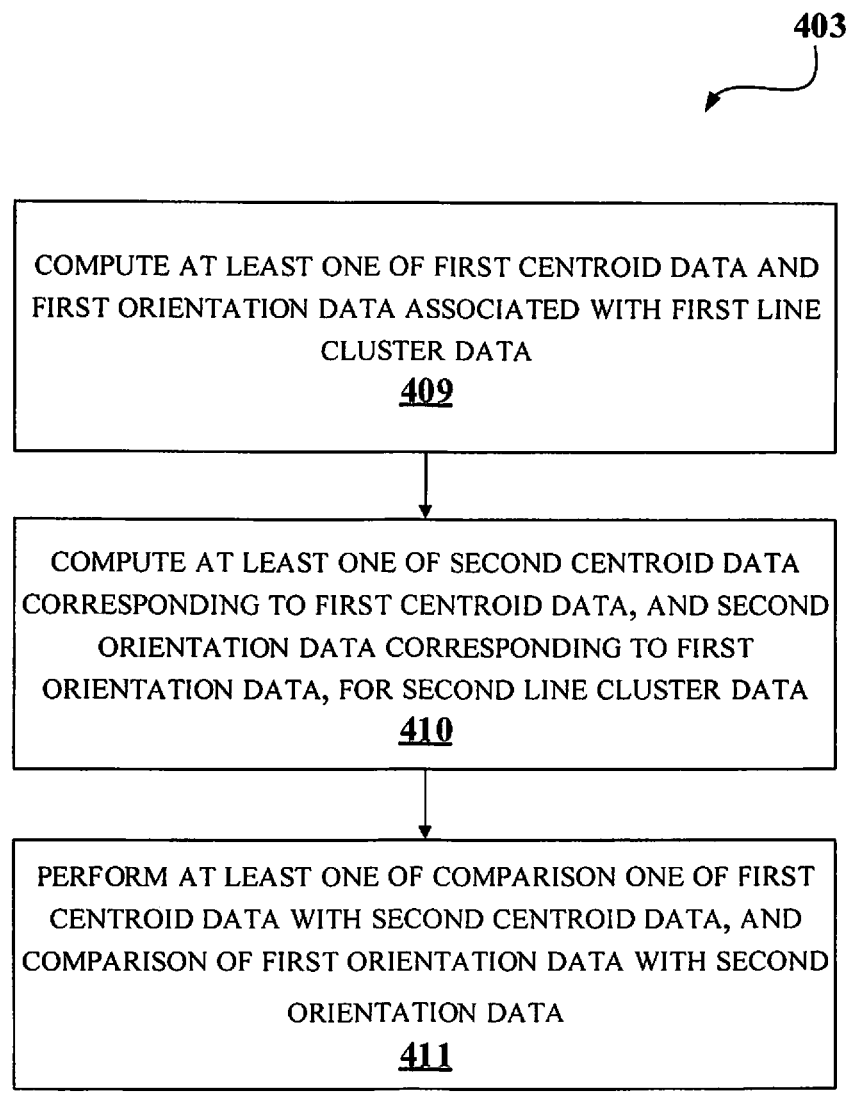
FIG. 4b illustrates a flowchart showing an exemplary method for tracking a determined first cluster, in accordance with some embodiments of present disclosure.

At block 403, when the viewing angle 208 of the Lidar sensor for each of the one or more static objects is not 90 degrees, the static object track module 202 may be configured to track each of the one or more static objects until the viewing angle 208 of the Lidar sensor for a corresponding static object is 90 degrees. FIG. 4b illustrates a flowchart showing an exemplary method for tracking each of the one or more static objects, in accordance with some embodiments of present disclosure.

At block 409, the static object track module 202 may be configured to compute at least one of the first centroid data and the first orientation data associated with the first line cluster data 207.

At block 410, the static object track module 202 may be configured to at least one of the second centroid data and the second orientation data associated with the second line cluster data 209 corresponding to the first line cluster data 207.

At block 411, the static object track module 202 may be configured to perform at least one of comparison one of the first centroid data with the second centroid data, and comparison of the first orientation data with the second orientation data, for detecting the non-observation.

Referring back to FIG. 4a, at block 404, when the viewing angle 208 of the Lidar sensor for each of the one or more static objects is 90 degrees, the static object track module 202 may be configured to stop tracking of the corresponding static object.

At block 405, the non-observation detection module 203 may be configured to check if the non-observation of the second line cluster data 209 corresponding to the first line cluster data 207 is detected for the one or more static objects from the one or more static objects. When the non-observation of the second line cluster data 209 corresponding to the first line cluster data 207 is detected, step at block 406 is performed. When the non-observation of the second line cluster data 209 corresponding to the first line cluster data 207 is not detected, step at block 402 is performed.

At block 406, when the non-observation of the second line cluster data 209 corresponding to the first line cluster data 207 is detected, the angle of non-observation determination module 204 may be configured to determine the angle of non-observation 210 for each of the one or more static objects. The angle of non-observation 210 is a viewing angle 208 of the Lidar sensor for a corresponding static object at an instant of time before the detection of the non-observation.

At block 407, the partial visual fault detection module 205 may be configured to detect the presence of the partial visual fault for the Lidar sensor based on the angle of non-observation 210 of each of one or more static objects.

At block 408, the partial visual fault detect module may be configured to notify the presence of the partial visual fault to the navigation system 103 associated with the moving vehicle.

As illustrated in FIGS. 4a and 4b, the methods 400 and 403 may include one or more blocks for executing processes in the detection system 101. The methods 400 and 403 may be described in the general context of computer executable instructions. Generally, computer executable instructions can include routines, programs, objects, components, data structures, procedures, modules, and functions, which perform particular functions or implement particular abstract data types.

The order in which the methods 400 and 403 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

Computing System

Figure 5:
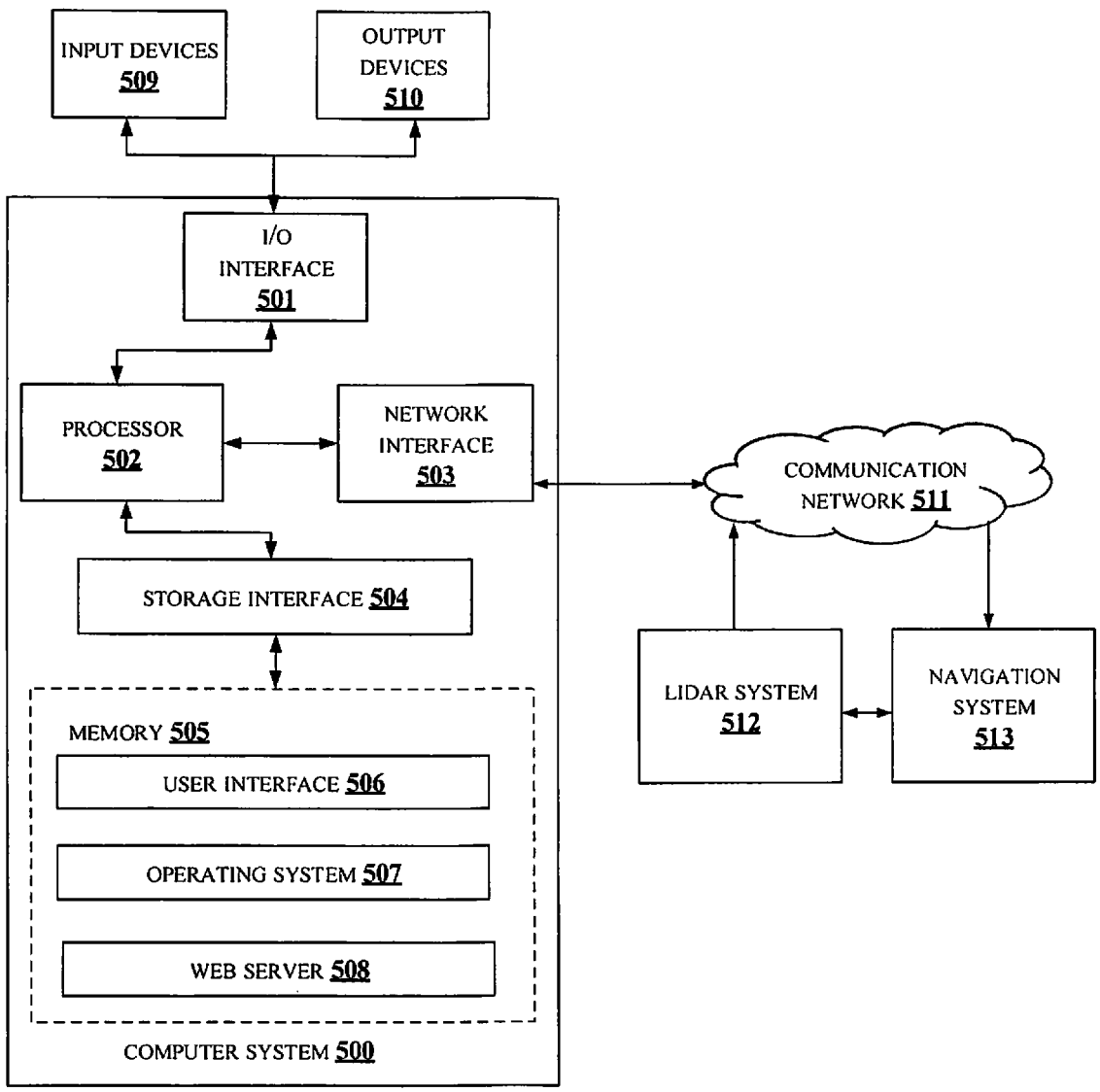
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the detection system 101. The computer system 500 may include a central processing unit ("CPU" or "processor") 502. The processor 502 may include at least one data processor for executing processes in Virtual Storage Area Network. The processor 502 may include specialized processing units such as, integrated system (bus) controllers, memory management control units, floating point units, graphics processing units, digital signal processing units, etc.

The processor 502 may be disposed in communication with one or more input/output (I/O) devices 509 and 510 via I/O interface 501. The I/O interface 501 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices 509 and 510. For example, the input devices 509 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 510 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 may consist of the detection system 101. The processor 502 may be disposed in communication with the communication network 511 via a network interface 503. The network interface 503 may communicate with the communication network 511. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 511 may include, without limitation, a direct interconnection, local area network (LAN), wide area network (WAN), wireless network (e.g., using Wireless Application Protocol), the Internet, etc. Using the network interface 503 and the communication network 511, the computer system 500 may communicate with a Lidar sensor system 512 and a navigation system 513 for detecting presence of partial visual fault associated with a lidar sensor of a moving vehicle. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 511 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™OS/2, MICROSOFT™ WINDOWS™ (XP™, VISTA™/7/8, 10 etc.), APPLE® IOS™, GOOGLE® ANDROID™, BLACKBERRY® OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

Advantages

An embodiment of the present disclosure provisions realtime method for detection fault in vision of the Lidar system. By which, safety of a vehicle is ensured.

An embodiment of the present disclosure uses simpler form of Lidar data to identify presence of faults in the Lidar system. By this, computations overhead may be reduced, and detection may be done in lesser time.

An embodiment of the present disclosure provisions robust method for detecting fault in the Lidar system. The detection is backed by previous correct decision of the system and hence, erroneous detection may be reduced.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIGS. 4a and 4b show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
|---|---|
| 100 | Environment |
| 101 | Detection system |
| 102 | Lidar system |
| 103 | Navigation system |
| 104 | Communication network |
| 105 | Processor |
| 106 | I/O interface |
| 107 | Memory |
| 108 | Modules |
| 109 | Data |
| 201 | Line cluster data determination module |
| 202 | Static object track module |
| 203 | Non-observation detection module |
| 204 | Angle of non-observation determination module |
| 205 | Partial visual fault detection module |
| 206 | Other modules |
| 207 | First line cluster data |
| 208 | Viewing angle data |
| 209 | Second line cluster data |
| 210 | Angle of non-observation data |
| 211 | Partial visual fault data |
| 212 | Other data |
| 301 | Moving vehicle |
| 302.1 | First predefined view |
| 302.2 | Second predefined view |
| 303.1 . . . 303.4 | One or more static objects |
| 304.1 . . . 304.4 | First line clusters |
| 305.1 . . . 305.4 | Second line clusters |
| 500 | Computer System |
| 501 | I/O Interface |
| 502 | Processor |
| 503 | Network Interface |
| 504 | Storage Interface |
| 505 | Memory |
| 506 | User Interface |
| 507 | Operating System |
| 508 | Web Server |
| 509 | Input Devices |
| 510 | Output Devices |
| 511 | Communication Network |
| 512 | Lidar system |
| 513 | Navigation system |

We claim:

1. A method of detecting presence of a partial visual fault associated with a Light Detection and Ranging (Lidar) sensor of a moving vehicle, wherein the method comprising:
   determining, by a detection system, a first line cluster data comprising coordinate points associated with one or more static objects present within a first predefined view of the Lidar sensor in the moving vehicle;
   tracking, by the detection system, each of the one or more static objects until a viewing angle of the Lidar sensor for a corresponding static object is 90 degrees, wherein the tracking is performed based on a second line cluster data, in a second predefined view of the Lidar sensor, corresponding to the first line cluster data for the one or more static objects, wherein distance of view of the Lidar sensor from the moving vehicle for the first predefined view is greater than distance of view for the second predefined view, and wherein the tracking comprises:
      computing first centroid data and first orientation data associated with the first line cluster data;
      computing second centroid data corresponding to the first centroid data, and second orientation data corresponding to the first orientation data, for the second line cluster data; and
      performing comparison of the first centroid data with the second centroid data, and comparison of the first orientation data with the second orientation data, to detect continuity of observation;
   detecting, by the detection system, a non-observation of the second line cluster data corresponding to the first line cluster data, for static objects of the one or more static objects;
   determining, by the detection system, an angle of non-observation for the static objects upon the detection, representation by the first line cluster and tracking by the second line cluster, wherein the angle of non-observation is the viewing angle of the Lidar sensor for the corresponding static object at an instant of time just before the detection of the non-observation; and
   detecting, by the detection system, presence of the partial visual fault associated with the Lidar sensor based on the angle of non-observation of the static objects, for notifying a navigation system associated with the moving vehicle.

2. The method as claimed in claim 1, wherein at least one of the first line cluster data and the second line cluster data comprises coordinate points connected to form a line cluster.

3. A detection system for detection of a partial visual fault associated with a Light Detection and Ranging (Lidar) sensor of a moving vehicle, said detection system comprises:
   a processor; and
   a memory communicatively coupled to the processor, wherein the memory stores processor-executable instructions, which, on execution, cause the processor to:
      determine a first line cluster data comprising coordinate points associated with one or more static objects present within a first predefined view of the Lidar sensor in the moving vehicle;
      track each of the one or more static objects until a viewing angle of the Lidar sensor for a corresponding static object is 90 degrees, wherein the tracking is performed based on a second line cluster data, in a second predefined view of the Lidar sensor, corresponding to the first line cluster data for the one or more static objects, wherein distance of view of the Lidar sensor from the moving vehicle for the first predefined view is greater than distance of view for the second predefined view, and wherein the tracking comprises:
         computing first centroid data and first orientation data associated with the first line cluster data;
         computing second centroid data corresponding to the first centroid data, and second orientation data corresponding to the first orientation data, for the second line cluster data; and
         performing comparison of the first centroid data with the second centroid data, and comparison of the first orientation data with the second orientation data, to detect continuity of observation;
      detect a non-observation of the second line cluster data corresponding to the first line cluster data, for static objects of the one or more static objects;

determine an angle of non-observation for the static objects upon the detection, representation by the first line cluster and tracking by the second line cluster, wherein the angle of non-observation is the viewing angle of the Lidar sensor for a corresponding static object at an instant of time just before the detection of the non-observation; and detect presence of the partial visual fault associated with the Lidar sensor based on the angle of non-observation of the static objects, for notifying a navigation system associated with the moving vehicle.

4. The detection system as claimed in claim 3, wherein at least one of the first line cluster data and the second line cluster data comprises coordinate points connected to form a line cluster.

5. A non-transitory computer readable medium including instructions stored thereon that when processed by at least one processor cause a device to perform operations comprising:

determining a first line cluster data comprising coordinate points associated with one or more static objects present within a first predefined view of a Lidar sensor in a moving vehicle;

tracking each of the one or more static objects until a viewing angle of the Lidar sensor for a corresponding static object is 90 degrees, wherein the tracking is performed based on a second line cluster data, in a second predefined view of the Lidar sensor, corresponding to the first line cluster data for the one or more static objects, wherein distance of view of the Lidar sensor from the moving vehicle for the first predefined view is greater than distance of view for the second predefined view, and wherein the tracking comprises:

computing first centroid data and first orientation data associated with the first line cluster data;

computing second centroid data corresponding to the first centroid data, and second orientation data corresponding to the first orientation data, for the second line cluster data; and performing comparison of the first centroid data with the second centroid data, and comparison of the first orientation data with the second orientation data, to detect continuity of observation;

detecting a non-observation of the second line cluster data corresponding to the first line cluster data, for static objects of the one or more static objects;

determining an angle of non-observation for the static objects upon the detection, representation by the first line cluster and tracking by the second line cluster, wherein the angle of non-observation is the viewing angle of the Lidar sensor for a corresponding static object at an instant of time just before the detection of the non-observation; and detecting presence of a partial visual fault for the Lidar sensor based on the angle of non-observation of the static objects, for notifying a navigation system associated with the moving vehicle.

6. The non-transitory computer readable medium as claimed in claim 5, wherein at least one of the first line cluster data and the second line cluster data comprises coordinate points connected to form a line cluster.

* * * * *